H. HUBBELL.
INCANDESCENT LAMP SOCKET.
APPLICATION FILED MAY 31, 1912.
1,107,951.
Patented Aug. 18, 1914.
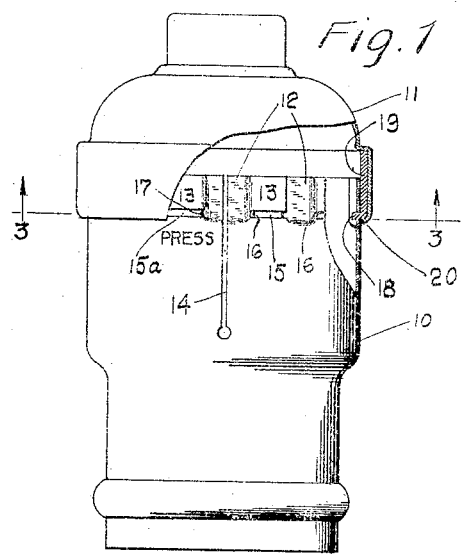
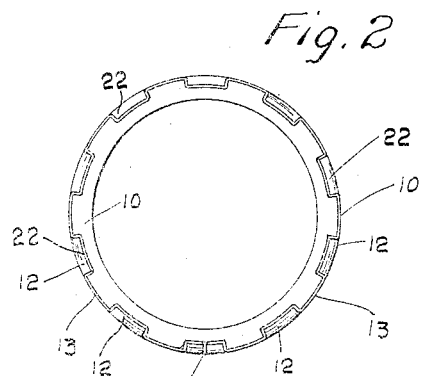
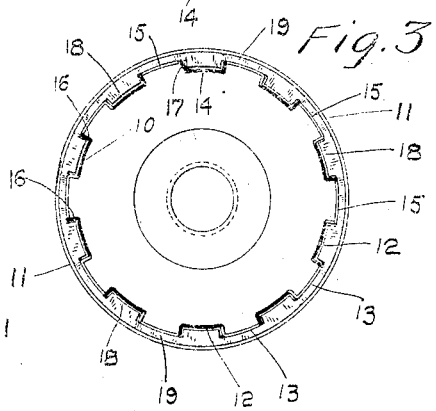
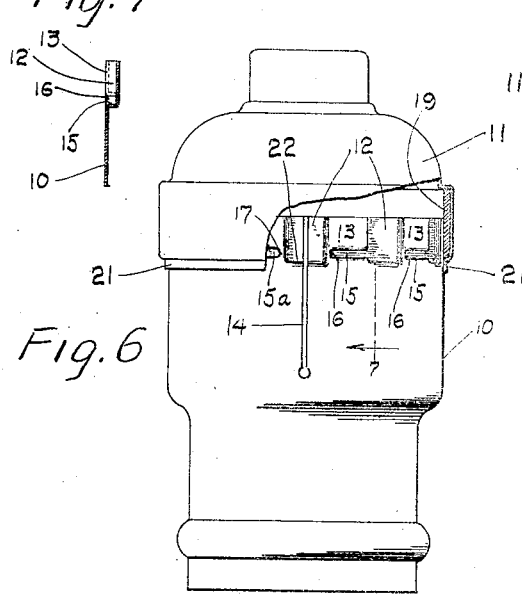
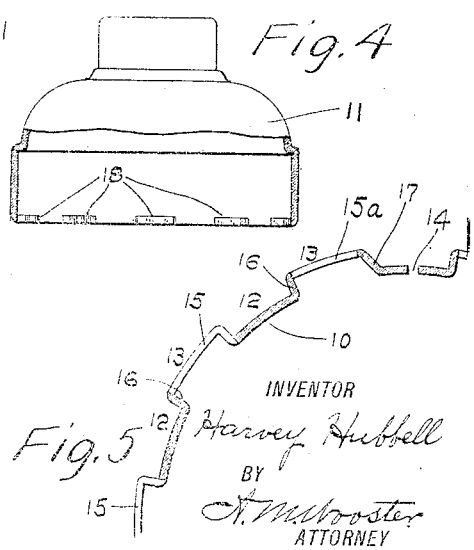
WITNESSES:
H. W. Meade
S. W. Atherton
INVENTOR
Harvey Hubbell
BY
A. M. Wooster
ATTORNEY

UNITED STATES PATENT OFFICE.

HARVEY HUBBELL, OF BRIDGEPORT, CONNECTICUT.

INCANDESCENT-LAMP SOCKET.

1,107,951.   Specification of Letters Patent.   Patented Aug. 13, 1914.

Application filed May 31, 1912. Serial No. 700,627.

*To all whom it may concern:*

Be it known that I, HARVEY HUBBELL, a citizen of the United States, residing at Bridgeport, county of Fairfield, State of Connecticut, have invented an Improvement in Incandescent-Lamp Sockets, of which the following is a specification.

This invention has for its object to produce a simple and inexpensive mode of connecting the members of incandescent lamp sockets which will provide a complete circular series of points of engagement, in which the engaging means shall be wholly concealed and which will permit connection in any position, engagement and locking by slight rotary movement and disengagement and unlocking by inward pressure upon one member and a slight reverse movement.

In the accompanying drawing forming a part of this specification, Figure 1 is an elevation of a lamp socket partly broken away to show the engagement of the members; Fig. 2 a plan view of the shell detached; Fig. 3 a section on the line 3—3 in Fig. 1, looking in the direction of the arrows; Fig. 4 an elevation, partly in section, of the cap detached, showing a variant form of construction; Fig. 5 a greatly enlarged sectional view of the shell detached on the same section line as that of Fig. 3; Fig. 6 a view corresponding with Fig. 1, illustrating a variant form of construction; and Fig. 7 is a detail sectional view on the line indicated by 7, in Fig. 6, looking in the direction of the arrows.

The two members comprise a shell 10 and a cap 11, said members being provided with a circular series of coöperating engaging elements which are caused to engage by rotary movement of one member relatively to the other. The edge of the shell is provided with a series of depressions 12 between which are ribs 13 which are left to correspond in contour with the body of the shell. The engaging elements on the shell are transverse grooves or slots 15 in the ribs. In Figs. 1 and 5 I have shown these elements as slots and in Figs. 6 and 7 as grooves. At the base of each depression is a shoulder 22 and extending vertically through one of the depressions and down into the body of the shell is a slot 14 which gives resilience to the shell, for a purpose that will presently be apparent.

The essential feature of the cap is a series of inwardly extending projections 18 which correspond in number with the transverse slots, and are adapted to be turned into engagement with said slots. When the shell is formed from relatively light metal, projections 18 may be formed upon a ring 19 of heavier metal which is retained in place by closing the metal at the lower edge of the cap about it, as at 20 in Fig. 1. Where the cap is formed from relatively heavy metal, the projections may be formed integral with the cap, as clearly shown in Fig. 4. It will be noted that the members when engaged are held against longitudinal displacement by a series of bayonet joints extending entirely around the members, so that it is made practically impossible to detach the members longitudinally. Suitable stops may be provided to limit the forward rotation of the cap when the projections have passed into the transverse slots, and also means for locking the cap against backward movement. In the present instance I have shown the left ends of the transverse slots as closed by integral stop walls 16, which are adapted to be engaged by the projections. It is immaterial whether all or a part only of the transverse slots are provided with means for stopping the forward rotation of the cap.

As a lock against backward movement I provide the right end of the transverse slot in the next rib to the left of vertical slot 14, said transverse slot being specifically indicated by 15ª, with a suitable locking means 17, shown in the present instance as an inclined locking wall, see Fig. 5, which shows the shell in section on the same line as in Fig. 3.

The form illustrated in Figs. 6 and 7 differs from the form in Figs. 1 and 5 in that a downwardly extending flange 21 is formed at the lower end of the cap, and the engaging element shown is a groove in lieu of a slot.

The operation is as follows: The shell and cap are placed together in any relative position with the projections engaging the shoulders at the bases of the depressions, any projection passing freely into any of the depressions. In this position of the parts, forward rotation of the cap relatively to the shell will cause the projections to pass into the transverse slots, the rotary movement being stopped by the engagement of the projections with the stops at the left ends of the slots. Reverse movement of the cap is prevented by the engagement of one of the projections with the locking means at the right end of the transverse slot specifically indicated by 15ª, so that the parts are now locked together and against movement in any direction relatively to each other. This locking of the parts may be overcome by pressing inward upon the shell close to vertical slot 14 on the left side, sufficiently to depress the locking means below the contiguous projection, or far enough so that the projection will ride up over the locking means and spring it out of the way. It will be noted, (see Fig. 5) that the outer face of the locking means is an incline, so that in the locking movement, the contiguous projection will ride up the outer face of the locking means and spring it downward until the projection has passed, when the locking means will spring up back of the projection and lock the members against the possibility of reverse movement until the shell is pressed inward as already described.

Having thus described my invention I claim:

1. An incandescent lamp socket comprising a shell provided with alternate depressions and ribs, one of said depressions having a vertical slot through it and said ribs having transverse slots with stops at one end, and the transverse slot on one side of the vertical slot having a locking stop at the opposite end, and a cap having inwardly extending projections adapted to pass into the depressions and to be turned into the transverse slots.

2. An incandescent lamp socket comprising a shell having a series of equal alternate longitudinal depressions and ribs, one of said depressions having a vertical slot through it and a cap having projections corresponding with the depressions on the shell, and adapted to enter therein, the ribs on the shell being provided with transverse slots adapted to receive the projections upon rotation of the cap, each of said slots having a stop at one end to prevent rotation in that direction and one of said slots having a locking stop at the other end thereof to prevent rotation in the opposite direction, said locking stop being adapted to release the projection when the shell is pressed inward contiguous to the vertical slot.

3. An incandescent lamp socket comprising a shell provided with alternate depressions and ribs, one of said depressions having a vertical slot through it and said ribs having transverse slots with stops at their left ends, and the transverse slot at the left of the vertical slot having a locking stop at its right end, and a cap having inwardly extending projections adapted to pass into the depressions and to be turned into the transverse slots.

4. An incandescent lamp socket comprising a shell provided with alternate depressions and ribs, said depressions terminating in shoulders and said ribs being provided with transverse slots having stops at their left ends, and one of said slots having a locking stop at its right end, and a cap having inwardly extending projections which enter the depressions and engage the shoulders and are then turned into the transverse slots.

In testimony whereof I affix my signature in presence of two witnesses.

HARVEY HUBBELL.

Witnesses:
A. M. WOOSTER,
S. W. ATHERTON.